United States Patent [19]
Lodi

[11] 3,719,971
[45] March 13, 1973

[54] CABLE HANGER AND CLAMP
[75] Inventor: Frank Lodi, Niles, Ill.
[73] Assignee: Richco Plastics Company Chicago, Ill.
[22] Filed: March 4, 1971
[21] Appl. No.: 120,865

[52] U.S. Cl. .................................24/73 PB, 248/74 PB
[51] Int. Cl. ................................................A44b 21/00
[58] Field of Search ...24/73 PB, 73 PF, 73 AP, 73 P, 24/16 PB; 248/74 PB; 85/5 R

[56] References Cited

UNITED STATES PATENTS

| 3,415,155 | 12/1968 | Riddell et al. | 24/73 PF X |
|---|---|---|---|
| 3,421,187 | 1/1969 | Ryder | 248/74 PB X |
| 3,500,505 | 3/1970 | Thompson | 24/16 PB |
| 3,577,603 | 5/1971 | Seckerson | 24/73 P |

FOREIGN PATENTS OR APPLICATIONS

| 875,935 | 8/1961 | Great Britain | 24/16 PB |

*Primary Examiner*—Donald A. Griffin
*Attorney*—Martin Faier

[57] ABSTRACT

A cable hanger and clamp for securing a bundle of one or more electric, hydraulic, or pneumatic lines or parts, comprising a band of molded plastic insulating material and means for clamping the band around the bundle and retaining the bundle in clamped position and for resiliently mounting the clamped bundle on a selected surface.

6 Claims, 6 Drawing Figures

PATENTED MAR 13 1973 3,719,971
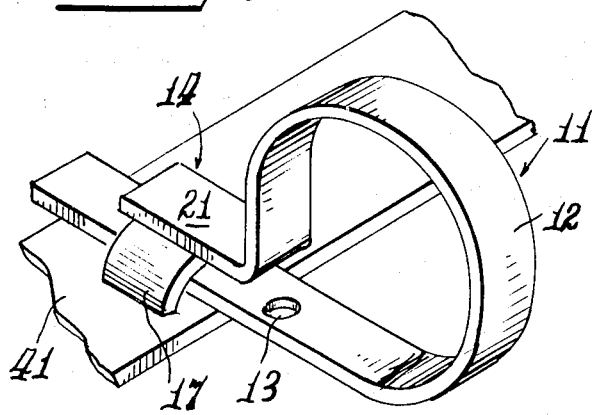
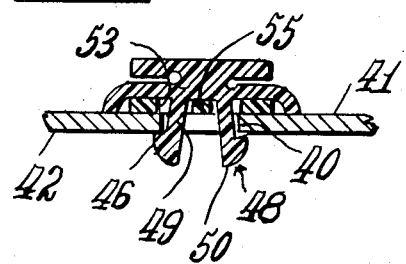
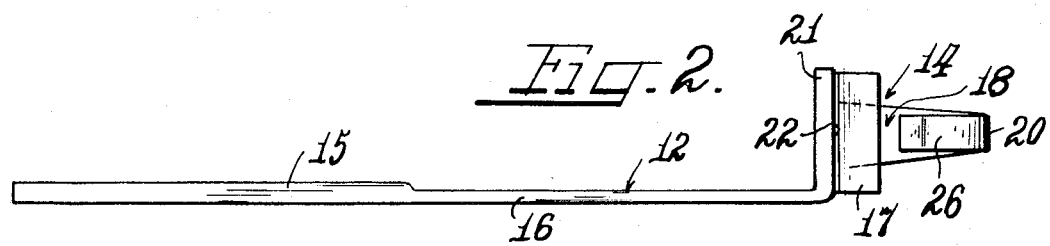
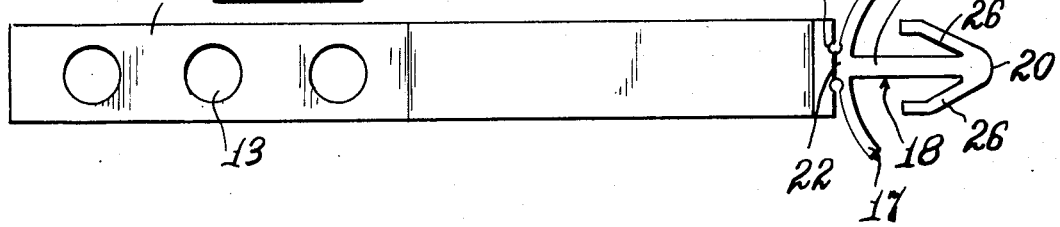
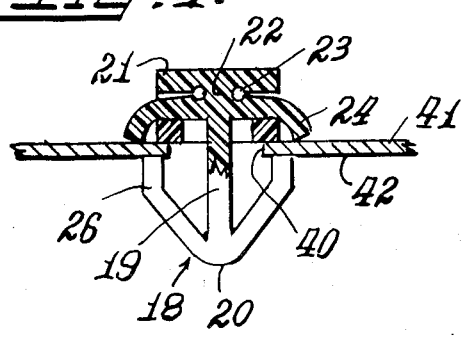
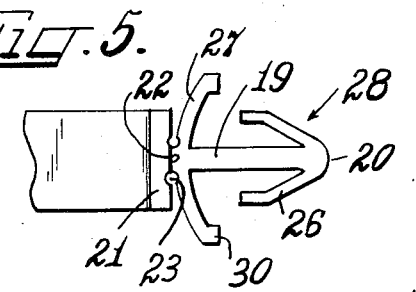
Inventor.
Frank Lodi.
Martin Haier
Atty.

CABLE HANGER AND CLAMP

This invention relates to cable hanger and clamps, and is more particularly directed to a cable hanger and clamp of molded plastic insulating material of one-piece construction, which may be used for fastening a bundle of one or more conduits or components to a selected surface.

Such cable hangers and clamps are commonly used for securing wires or parts in electric appliances and machines. They must be durable, strong, lightweight, resilient, resistant to corrosion and abrasion, unaffected by moisture, and possess electrical insulating properties. These devices must be inexpensive and easy to apply, for use in mass production on assembly lines, and they must be simple to manufacture.

The device of the character referred to which embodies the present invention comprises a band of molded plastic insulating material, which may be wrapped around a bundle of one or more conduits or components, and has one end which is threaded through and nested over the other end to clamp and secure the bundle and fasten it to a mounting surface. The herein disclosed device is sufficiently versatile to permit its use on a variety of bundle thicknesses and on a variety of mounting surfaces.

It is therefore an object of the present invention to provide a cable hanger and clamp of the character referred to which is simple and inexpensive to manufacture and easy to use.

Another object of the invention is to provide a cable hanger and clamp which will positively support a bundle of one or more conduits or components on a selected mounting surface.

Another object is to provide a versatile cable hanger and clamp which may be used in association with bundles of wires or devices of varying diameter and mounting surfaces of varying thickness.

Another object is to provide a cable hanger and clamp which is of one piece construction, and can be installed without hardware or tools, but cannot be easily removed without deforming it.

Another object of the invention is to provide a cable hanger and clamp which permits positive self-locking of the clamp about a bundle of conduits or components, and is self-supporting on a selected mounting surface.

Other objects and advantages of the present invention will become apparent from this description, the accompanying drawings, and the appended claims. In the drawings:

FIG. 1 is a perspective view of one embodiment of the invention, mounted on a surface.

FIG. 2 is a side elevational view of the device shown in FIG. 1, with a portion of the mounting means in dotted lines.

FIG. 3 is a top plan view of the device shown in FIG. 2.

FIG. 4 is a section view of the locking and mounting means of the device shown in FIG. 1.

FIG. 5 is a fragmentary detail plan view similar to FIG. 3 of a modified mounting prong.

FIG. 6 is a fragmentary detail section view of another modified device.

Referring now to the accompanying drawings, and particularly to the embodiment disclosed in FIGS. 1 – 4, the cable hanger and clamp 11 comprises a flexible band 12 for encircling a bundle of one or more conduits or components having a series of closure apertures 13 at one end of the band, and mounting and clamping means 14 at the other end of the band.

The band 12 is formed to provide a thickened, reinforced base 15 and a thinner, relatively more flexible strap 16. The mounting and clamping means 14, preferably at a right angle to the band, comprises a leg 21, a resilient support 17 and a mounting prong 18, having a stem 19 and a blunt point 20 with angular wings 26 depending therefrom. The support 17 is connected to the leg 21 by a web 22, and additional flexibility is imparted thereto by flexure grooves 23, preferably at each side of the web. Opposed free ends 24 of the support 17 are arched toward the wings 26.

In the modified mounting prong 28 shown in FIG. 5, the support 27 is formed with extensions 30 on each opposed free end 34 thereof, as to provide a flattened and more rigid support when the cable hanger and clamp is in secured and mounted position.

As shown in FIG. 6, another modified mounting prong 48, split longitudinally along the stem 49 and point 50, and having a pair of locking barbs 46, may be provided, and a bar 55 across the band apertures 53 divides the apertures to accommodate the split prong, thus inhibiting relative twisting of the band and mounting and clamping means when in assembled condition.

In use, a bundle of conduits or components is laid over the flexible strap 16 of band 12, and the mounting and clamping means is brought around the circumference of the bundle. The mounting prong 18 or 48 is threaded through a selected one of the closure apertures 13 or 53, respectively, by press-fitting, and locked in place, by wings 26 or barbs 46, respectively. A hole 40 of suitable diameter, which may be prepunched, is provided in the mounting surface 41, and the clamped bundle is secured to the surface in a manner substantially similar to the closure of the clamp previously described.

The support 17 or 27 will yield at its free ends 24 and 34, respectively, and bear against the mounting surface 41, and spreading the wings 26 or barbs 46, respectively, which bear against the underside 42 of the mounting surface, thus securing the device in position. The mounting will be resilient, while still supporting the bundle, because of the flexible nature of the materials and the flexible gripping and bearing of the device on the mounting surface.

Ordinarily, withdrawal of the device from the mounting surface cannot be accomplished unless the wings 26 or barbs 46 are urged toward one another to clear the hole in the mounting surface. The weight of the clamped bundle and normal vibration or movement of the mounting surface of the electrical appliance or machine will not be sufficient to unlock and dislodge the device without intentional manipulation of the mounting prong.

A variety of bundle diameters may be accommodated, depending on the closure aperture selected, and a variety of mounting surface thicknesses may be accommodated because of the spring-like resiliency of the support and mounting prong.

Preferably, the cable hanger and clamp is fabricated in one piece by injection molding, and the preferable material is nylon, although other moldable resilient materials, such as rubber, ethyl cellulose or like polymers having dielectric insulating properties may be utilized.

A support formed in the manner shown may be molded onto the band adjacent each closure aperture, rather than above the mounting prong, in which case the stem must be lengthened to allow it to penetrate the surface aperture and to permit the wings or barbs to resiliently bear against the underside of the mounting surface in the position shown.

While I have illustrated and described preferred embodiments of the invention, it should be apparent that changes and modification may be made without departing from the spirit or scope of the invention, and I do not desire to be limited to the exact construction described.

I claim:

1. A one piece cable hanger and clamp of plastic material for mounting and supporting a bundle of one or more elements in position on a surface having an aperture, said hanger and clamp comprising a band for encircling the bundle and means for clamping the band about the bundle and securing the clamped bundle on said surface, said clamping and securing means including a resilient support having at least one yieldable free end, a web connecting the support to the band, and a prong having a yieldable wing adapted to pass through said aperture, said free end and wing being adapted to bear against opposed sides of the mounting surface.

2. The cable hanger and clamp recited in claim 1, wherein the clamping and securing means is disposed angularly to the band.

3. The cable hanger and clamp recited in claim 1, wherein the free end of the support has a leg extending substantially parallel to the longitudinal axis of the band.

4. The cable hanger and clamp recited in claim 1, wherein the band comprises a reinforced base portion having apertures therein and a strap portion more flexible than the base portion.

5. A one piece cable hanger and clamp of plastic material for mounting and supporting a bundle of one or more elements in position on a surface having an aperture, said hanger and clamp comprising an apertured band for encircling the bundle and means for clamping the band about the bundle and securing the clamped bundle on said surface, said clamping and securing means including a resilient support having at least one yieldable free end, a web connecting the support to the band, a prong having a yieldable wing adapted to pass through said mounting surface and band apertures, said free end and wing being adapted to bear against opposed sides of the mounting surface, and cooperating means in the prong and said band aperture to inhibit twisting of the band relative to the clamping and securing means.

6. The cable hanger and clamp recited in claim 5, wherein the cooperating means comprises a longitudinal slit on the prong and a bar across the aperture.

* * * * *